(12) United States Patent
Auvenshine et al.

(10) Patent No.: US 8,655,845 B2
(45) Date of Patent: Feb. 18, 2014

(54) REDUCING DUPLICATE INFORMATION WHEN REPORTING SYSTEM INCIDENTS

(75) Inventors: John J. Auvenshine, Tucson, AZ (US); Basheer N. Bristow, Vail, AZ (US); Carlin M. Kartchner, Durham, NC (US); Mauricio Perez Hernandez, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/347,837

(22) Filed: Jan. 11, 2012

(65) Prior Publication Data
US 2013/0179415 A1 Jul. 11, 2013

(51) Int. Cl.
*G06F 17/30* (2006.01)

(52) U.S. Cl.
USPC ........... 707/642; 707/664; 707/669; 707/692; 705/7.28

(58) Field of Classification Search
USPC ......... 707/634, 642, 664, 662, 663, 669, 692, 707/695, 702, 758, 603, 813, 816, 817; 705/1.1, 2, 7.11, 7.28, 7.29, 7.32, 7.36, 705/7.41, 7.42, 26.61, 312; 726/32
See application file for complete search history.

(56) References Cited

U.S. PATENT DOCUMENTS

| | | | | |
|---|---|---|---|---|
| 7,610,296 | B2 * | 10/2009 | Hughes et al. | 1/1 |
| 7,613,667 | B2 * | 11/2009 | Coen et al. | 706/21 |
| 2003/0023476 | A1 * | 1/2003 | Gainey | 705/10 |
| 2010/0281546 | A1 * | 11/2010 | Kruse et al. | 726/32 |
| 2011/0066908 | A1 | 3/2011 | Bartz et al. | |
| 2011/0078519 | A1 | 3/2011 | Yordanov et al. | |

\* cited by examiner

*Primary Examiner* — Greta Robinson
(74) *Attorney, Agent, or Firm* — Francis Lammes; Stephen J. Walder, Jr.; Randall J. Bluestone (57) ABSTRACT

A mechanism is provided for reducing duplicate information. Diagnostic data associated with a new incident that has occurred is received and at least one new incident dump file is created for the new incident that includes some or all of the diagnostic data. The diagnostic data in the at least one new incident dump file is compared to diagnostic data in at least one corresponding preceding incident dump file. Responsive to the at least one new incident dump file comprising diagnostic data that is different from the at least one corresponding preceding incident dump file, at least one comparison dump file is generated that comprises only the differences in the at least one new incident dump file that are not contained in the at least one corresponding preceding incident dump file. A report package that includes the at least one comparison dump file is then transmitted to a support system.

18 Claims, 4 Drawing Sheets

REDUCING DUPLICATE INFORMATION WHEN REPORTING SYSTEM INCIDENTS

BACKGROUND

The present application relates generally to an improved data processing apparatus and method and more specifically to mechanisms for reducing duplicate information when reporting system incidents.

In known computing systems that have automated or manual incident reporting features, when a computing system experiences an incident that results in an incident report, much of the data that may be reported may be duplicated from previous reports. This is particularly acute when a computing system repeatedly experiences the same or similar incidents. Duplicate information is also more severe when a computing system is configured to dump all information in order to aid support personnel in diagnosing the incident, even though all that may actually be needed is only a subset of the dumped data.

Known solutions to reduce duplicate information include: only collecting data that is needed at the time of the failure, which fails to address the issues with repeated failures, and reducing the size of the data being sent, which fails to address the issues with sending the same data repeatedly across multiple failures.

SUMMARY

In one illustrative embodiment, a method, in a data processing system, is provided for reducing duplicate information when reporting data processing system incidents. The illustrative embodiment receives diagnostic data associated with a new incident that has occurred in the data processing system. The illustrative embodiment creates at least one new incident dump file for the new incident that includes some or all of the diagnostic data. The illustrative embodiment compares the diagnostic data in the at least one new incident dump file to diagnostic data in at least one corresponding preceding incident dump file. The illustrative embodiment generates at least one comparison dump file that comprises only the differences in the at least one new incident dump file that are not contained in the at least one corresponding preceding incident dump file in response to the at least one new incident dump file comprising diagnostic data that is different from the at least one corresponding preceding incident dump file. The illustrative embodiment transmits a report package to a support system. In the illustrative embodiment, the report package includes the at least one comparison dump file.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an incident reporting system that transmits only changed or "delta" information from previous report packages rather than sending an entire report package from each encountered incident. In order for the incident reporting system to only send changed information, the incident reporting system stores a report package profile for each computing system that includes content of previously reported incidents. When a new incident occurs, the incident reporting system compares the information associated with the current incident to previously reported incidents in order to determine a difference or delta from the previously reported incidents. The incident reporting system determines what change or delta information to send using a data replication algorithm that identifies only the relevant and non-duplicate information. Thus, the present invention creates a computing system profile that is updated with each incident that is reported to a support system, rather than treating each incident in isolation. Further, the present invention maintains the computing system profile between the computing system and a support system used by support personnel.

Figure 1:
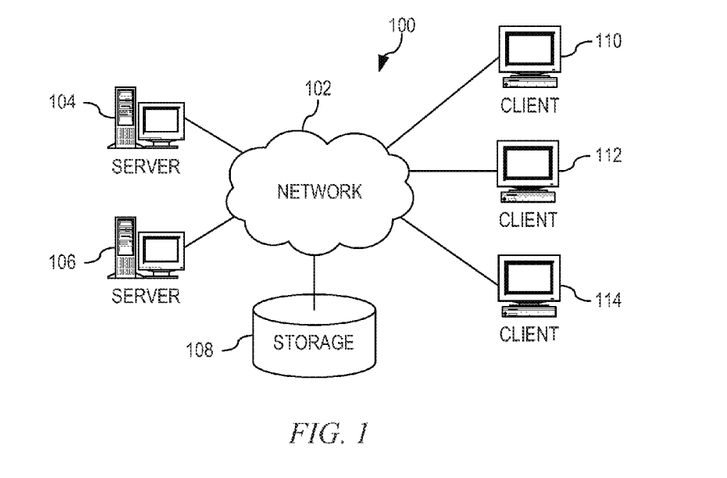
FIG. 1 is an example diagram of a distributed data processing system in which aspects of the illustrative embodiments may be implemented.
Figure 2:
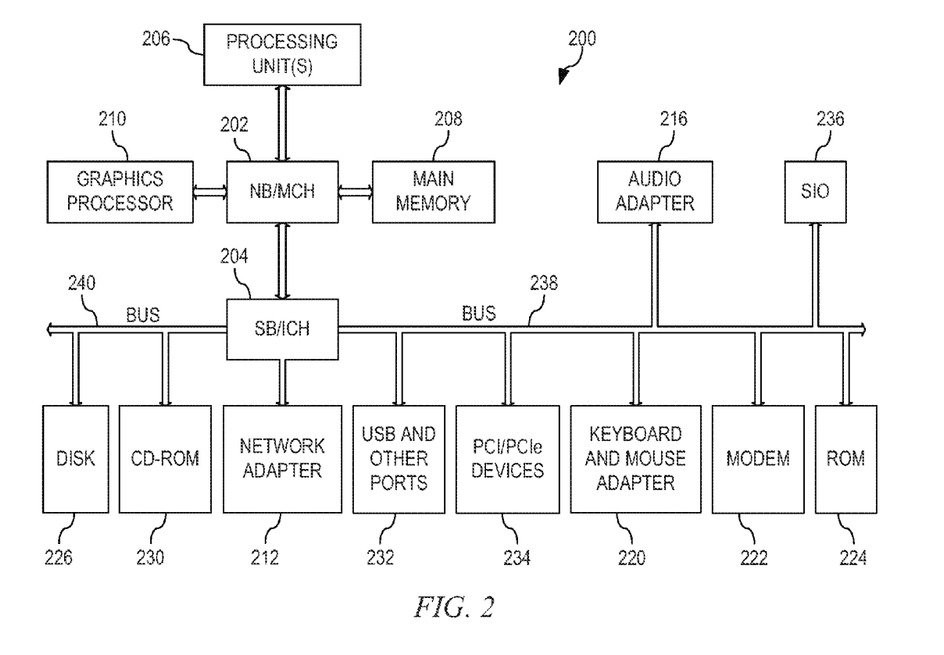
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, in order for the incident reporting system to only send changed information associated with a new incident, the incident reporting system stores a report package profile for each computing system that includes content of previously reported incidents. When a new incident occurs, the incident reporting system compares the information associated with the current incident to previously reported incidents in order to determine a difference or delta from the previously reported incidents. The incident reporting system determines what change or delta information to send using a data replication algorithm that identifies only the relevant and non-duplicate information.

Figure 3:
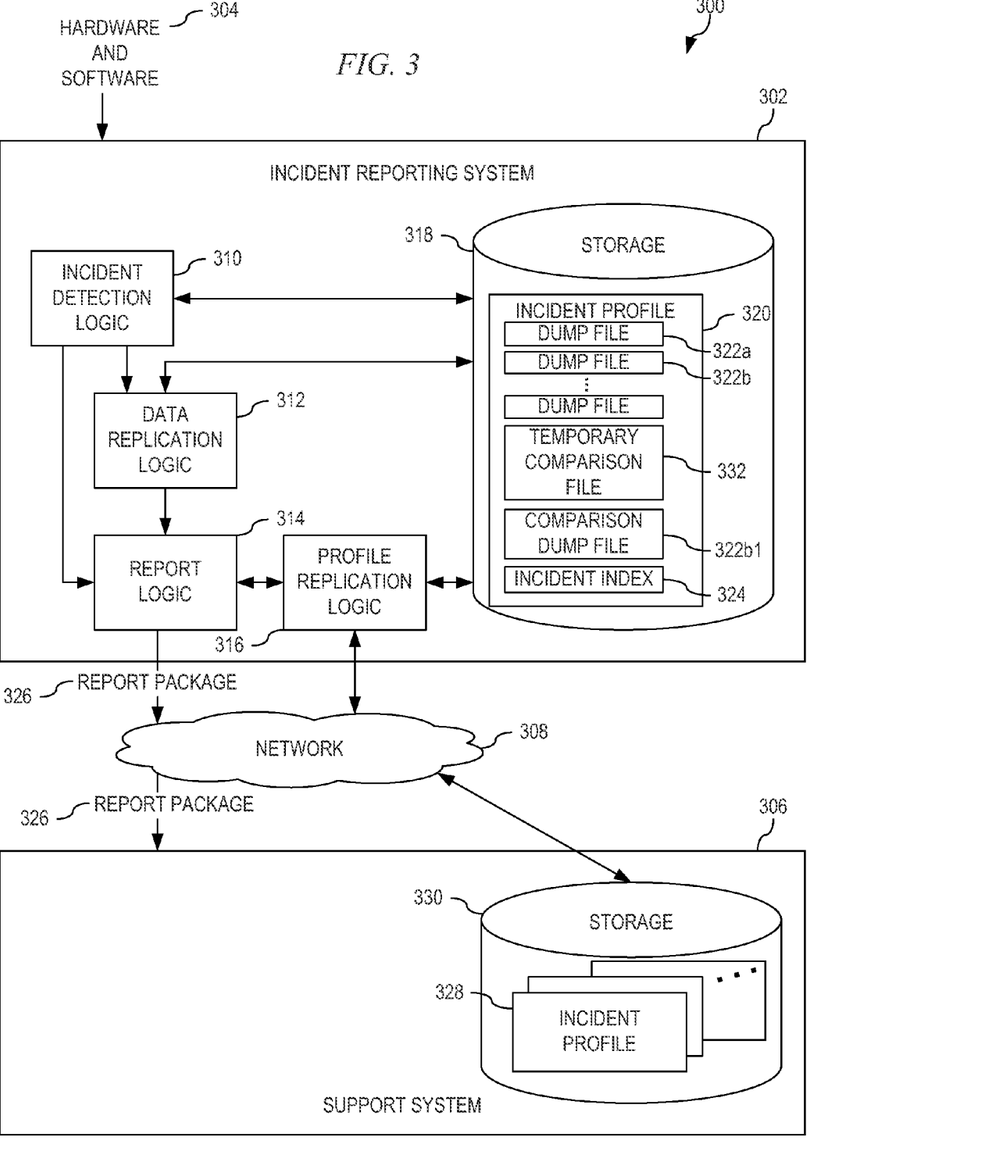
FIG. 3 depicts a functional block diagram of an incident reporting system in accordance with an illustrative embodiment.

FIG. 3 depicts a functional block diagram of an incident reporting system in accordance with an illustrative embodiment. Incident reporting system 302 in data processing system 300 is coupled to the various hardware and software 304 operating within data processing system 300 as well as being coupled to various support systems, such as support system 306 via network 308. Incident report system 302 comprises, among other logic, incident detection logic 310, data replication logic 312, report logic 314, profile replication logic 316, and storage 318. In operation, when a new incident occurs within a component in hardware and software 304, incident detection logic 310 receives an indication of the new incident and one or more dumps of diagnostic data associated with the new incident from the hardware and/or software in hardware and software 304 that has experienced the incident. That is, sometimes a single incident may cause more than one component to alert or fail and generate an individual dump of diagnostic data, resulting in more than one dump of diagnostic data. Support personnel require access to all dump files associated with an incident in order to properly diagnose the incident.

Incident detection logic 310 checks storage 318 to determine whether an incident profile exists for the one or more components of hardware and software 304. If incident detection logic 310 determines that an incident profile for the one or more components fails to exist within storage 318, incident detection logic 310 creates an incident profile 320 and one or more new incident dump file(s) 322a within incident profile 320 for each of the one or more components that includes all of the diagnostic data associated with the one or more new incidents from the one or more components in hardware and software 304 that has experienced the one or more new incidents. Incident detection logic 310 also creates incident index 324 within incident profile 320 that records incidents that have occurred, dates/times associated with the incidents, hardware and/or software affected by the incident, and tracking numbers associated with the reporting of the incident. Incident detection logic 310 updates incident index 324 with an identifier of the new incident, the date/time associated with the new incident, and the hardware and/or software affected by the new incident.

Incident detection logic 310 then notifies report logic 314 that a report package needs to be created and sent to support system 306. Report logic 314 creates report package 326 for each new incident that includes all of the diagnostic data associated with the new incident(s) recorded in new incident dump file(s) 322a within incident profile 320. Report logic 314 also assigns a unique tracking identifier to report package 326, which report logic 314 includes in report package 326 as well as updates incident index 324 with. Report logic 314 then sends report package 326 to support system 306. After report package 326 has been successfully sent to support system 306, report logic 314 notifies profile replication logic 316 to perform a profile replication. Upon receiving the notification, profile replication logic 316 replicates incident profile 320 in storage 318 with incident profile 328 in storage 330 of support system 306. Storage 330 stores a plurality of incident profiles, each of which are for a different computing system supported by support system 306.

The profile replication performed by profile replication logic 316 may comprise, based on user and/or support personnel predefined settings, replicating:

only the initial incident dump file or files (new incident dump file(s) 322a), any delta dump files, which will be described below, and incident index 324;

all incident dump files, any delta dump files, and incident index 324; or only delta dump files and incident index 324.

Once profile replication logic 316 has completed the profile replication, incident reporting system 302 waits for the next incident to occur.

If one or more new incident(s) occurs and incident detection logic 310 determines that incident profile 320 exists within storage 318, incident detection logic 310 creates one or more new incident dump file(s) 322b within incident profile 320 that includes all of the diagnostic data associated with each new incident from the one or more components in hardware and software 304 that has experienced the new incident. Incident detection logic 310 updates incident index 324 with an identifier of the new incident(s), the date/time associated with the new incident, and the hardware and/or software affected by the new incident.

Incident detection logic 310 then notifies data replication logic 312 to perform data replication detection with regard to new incident dump file(s) 322b. Data replication logic 312 accesses new incident dump file(s) 322b and preceding incident dump file(s) 322a in storage 318 in order to compare new incident dump file(s) 322b to preceding incident dump file(s) 322a. Preceding incident dump file(s) 322a for a particular component form a component diagnostic history for the component, such that the comparison of the new incident dump file(s) 322b is compared to all diagnostic information generated for the component. Initially, data replication logic 312 identifies whether the date/time associated with each new incident dump file(s) 322b differs from the date/time associated with each of the corresponding preceding incident dump file(s) 322a. In this context, "corresponding" refers to a dump file generated by the same subsystem, process, device driver, or other software module that generated a dump file in the preceding incident. Corresponding dump files may share common naming characteristics, directory locations, metadata tags, or other operational means of identifying their source. If data replication logic 312 determines that the corresponding dump files do not differ in date/time, then data replication logic 312 stops diagnostic data replication detection. If data replication logic 312 determines that the corresponding files do differ in date/time, data replication logic 312 determines a difference between new incident dump file(s) 322b and preceding incident dump file(s) 322a by performing, for example, a bit-wise or text-wise comparison depending on the type of diagnostic data in each dump file. The facility to perform a bit-wise or text-wise comparison of the diagnostic data is often built in to the operating system. For example, in Unix and Linux based operating systems, this facility is normally provided by the "diff" command. Other operating system families or versions may provide similar capabilities by different command names or application programming interfaces (APIs).

In comparing each of the new incident dump file(s) 322b to preceding incident dump file(s) 322a, data replication logic 312 generates a temporary comparison file 332 that comprises the differences identified in each new incident dump file 322b that do not exist in each corresponding preceding incident dump file 322a. When data replication logic 312 completes the comparison of a new incident dump tile 322b to a preceding incident dump file 322a, data replication logic 312 determines whether the file size of the temporary comparison the 332 is less than the file size of the corresponding new incident dump file 322b. If data replication logic 312 determines that the temporary comparison file 332 is less than the file size of the corresponding new incident dump file 322b, then data replication logic 312 stores the temporary comparison file 332 as a comparison dump file 322b1 (i.e. a delta file), which indicates that new incident dump file 322b comprises some information that is duplicated in preceding incident dump file 322a and has already been reported to support system 306. Converadly, if data replication logic 312 determines that the temporary comparison file 332 is greater than or equal to the file size of the corresponding new incident dump file 322b, then data replication logic 312 may recognize that this new incident dump file in 322b comprises completely different information from preceding corresponding incident dump file in 322a or data replication logic 312 may generate comparison dump file 322b1 as a delta file that is equivalent to new incident dump file 322b. In either case, data replication logic 312 updates incident index 324 to indicate that new incident dump file 322b is a delta file if data replication logic 312 recognizes that new incident dump file 322b comprises completely different information from preceding incident dump file 322a or data replication logic 312 updates incident index 324 to indicate that comparison dump file 322b1 is a delta file for new incident dump file 322b even though the tiles may be equivalent in size.

Data replication logic 312 then notifies report logic 314 that a report package needs to be created and sent to support system 306. Report logic 314 creates report package 326 for the new incident that includes all of the diagnostic data associated with the new incident recorded in new incident dump file 322b or comparison dump file 322b1 within incident profile 320 depending on implementation as described previously. Report logic 314 also assigns a unique tracking identifier to report package 326, which report logic 314 includes in report package 326 as well as updates incident index 324 with. Report logic 314 then sends report package 326 to support system 306. After report package 326 has been successfully sent to support system 306, report logic 314 notifies profile replication logic 316 to perform a profile replication. Upon receiving the notification, profile replication logic 316 replicates incident profile 320 in storage 318 with incident profile 328 in storage 330 of support system 306. Again, the profile replication performed by profile replication logic 316 may comprise, based on user and/or support personnel predefined settings, replicating:

only the initial incident dump file(s) (incident dump file(s) 322a), any delta dump files, which will be described below, and incident index 324;

all incident dump files, any delta dump files, and incident index 324; or only delta dump files and incident index 324.

Once profile replication logic 316 has completed the profile replication, incident reporting system 302 waits for the next incident to occur.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium's) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4A:
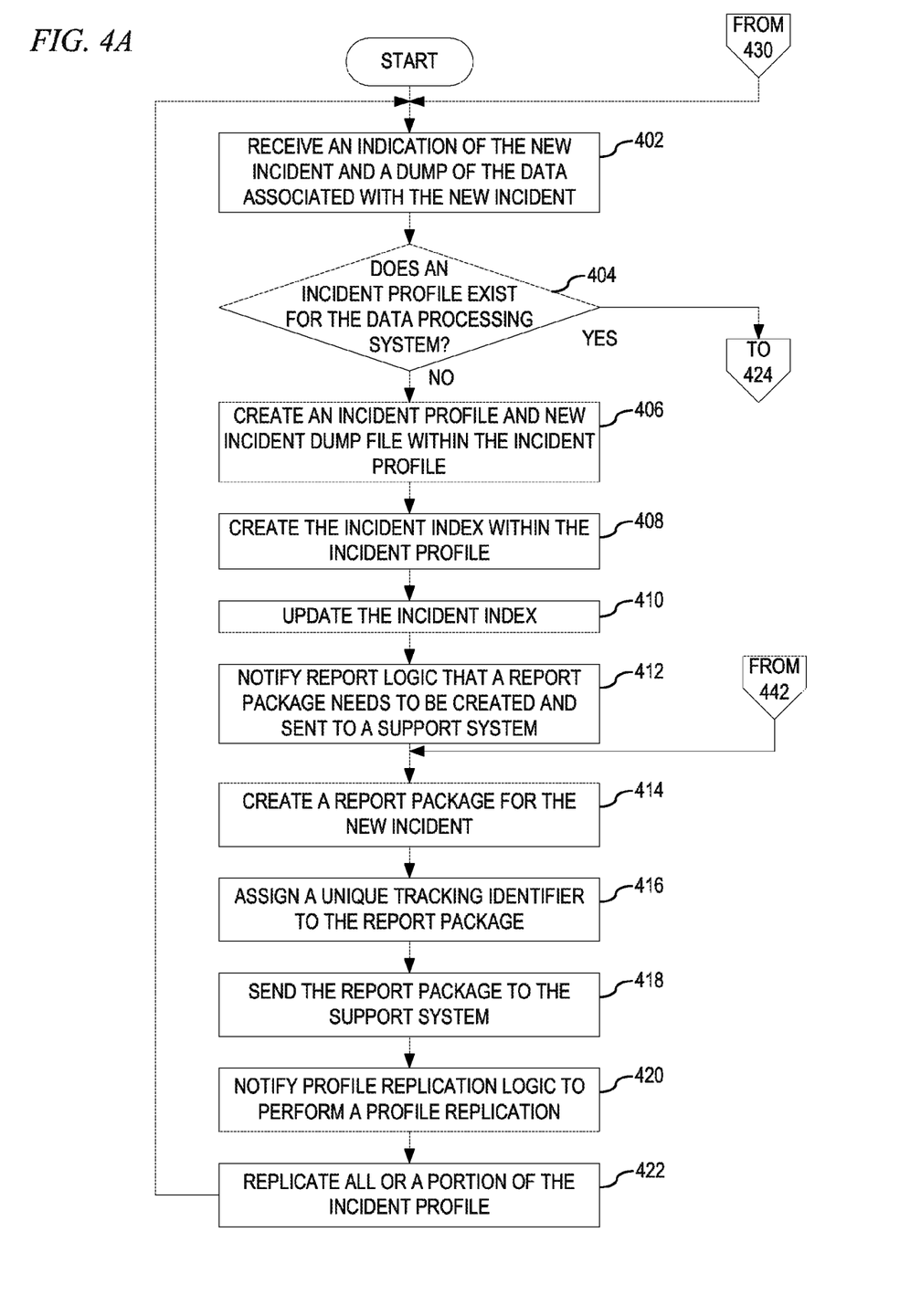
FIGS. 4A and 4B depict a flowchart of the operation performed by an incident reporting system in accordance with an illustrative embodiment.
Figure 4B:
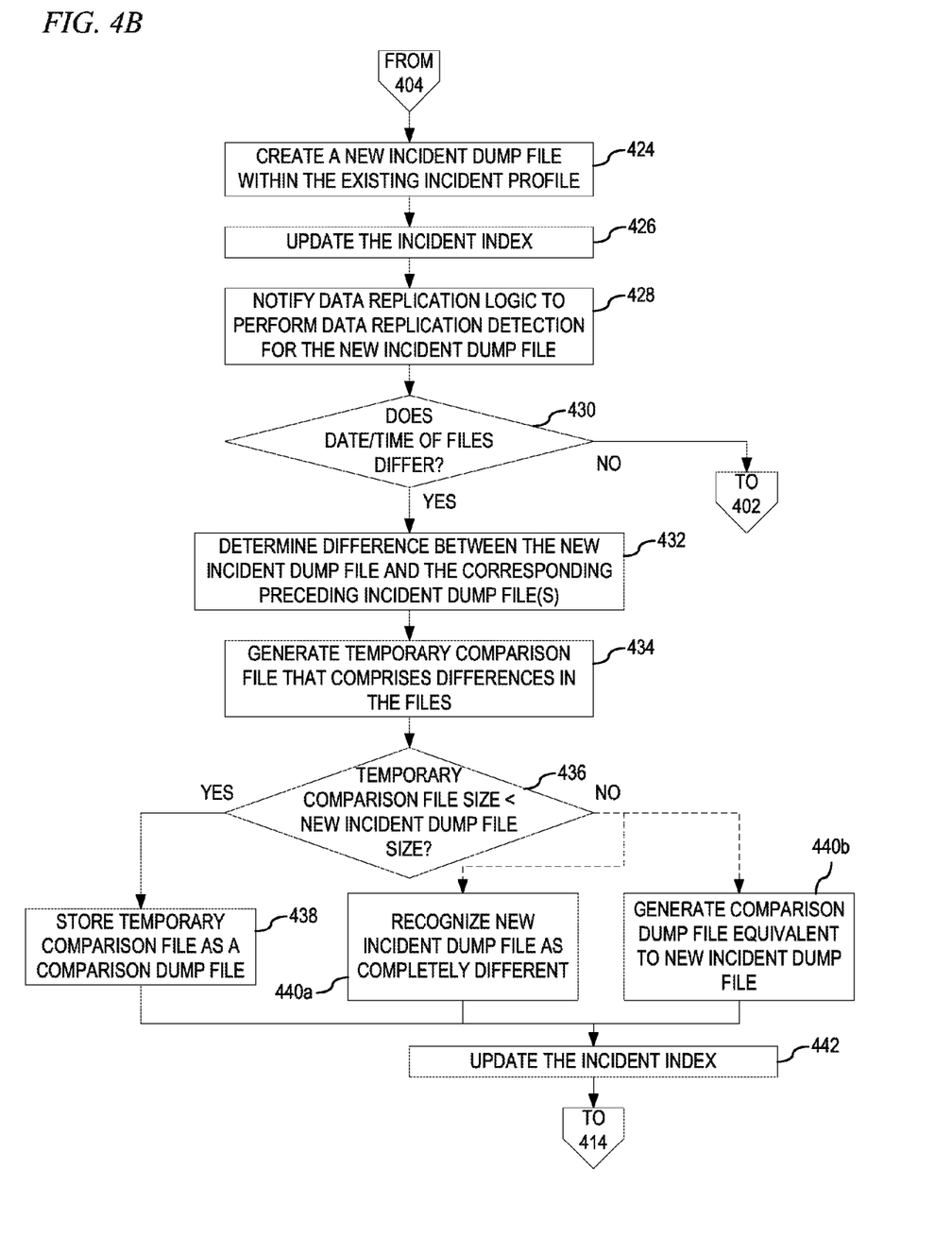

FIGS. 4A and 4B depict a flowchart of the operation performed by an incident reporting system in accordance with an illustrative embodiment. The operation described in FIGS. 4A and 4B is described for one component; however, one of ordinary skill in the art will recognize that a single incident may cause more than one component to alert or fail and generate an individual dump of diagnostic data, resulting in more than one dump of diagnostic data and the process described in FIGS. 4A and 4B are performed for each component. As the operation begins, incident detection logic receives an indication of the new incident and a dump of the diagnostic data associated with the new incident from the component that has experienced the incident (step 402). The incident detection logic checks storage in the data (processing system and determines whether an incident profile exists for the component (step 404). If at step 404 the incident detection logic determines that an incident profile fails to exist within the storage, the incident detection logic creates an incident profile and a new incident dump file within the incident profile that includes all of the diagnostic data associated with the new incident from the component that has experienced the new incident, thereby forming a component diagnostic history for that component (step 406).

The incident detection logic also creates the incident index within the incident profile that records incidents that have occurred, dates/times associated with the incidents, components affected by the incident, and tracking numbers associated with the reporting of the incident (step 408). The incident detection logic then updates the incident index with an identifier of the new incident, the date/time associated with the new incident, and the component affected by the new incident (step 410).

The incident detection logic then notifies report logic that a report package needs to be created and sent to a support system (step 412). The report logic creates a report package for the new incident that includes all of the diagnostic data associated with the new incident recorded in the new incident dump file(s) within the incident profile (step 414). The report logic also assigns a unique tracking identifier to the report package (step 416) which the report logic includes in the report package as well as updates incident index with. The report logic then sends the report package to the support system (step 418). After the report package has been successfully sent to the support system, the report logic notifies profile replication logic to perform a profile replication (step 420). Upon receiving the notification, the profile replication logic replicates all or a portion of the incident profile in the storage with an incident profile in a storage of the support system (step 422). The storage stores a plurality of incident profiles, each of which are for a different computing system supported by the support system. Once the profile replication logic has completed the profile replication, the incident reporting system waits for the next incident to occur by the process returning to step 402.

If at step 404 the incident detection logic determines that an incident profile exists within the storage, the incident detection logic creates a new incident dump file within the existing incident profile that includes all of the diagnostic data associated with the new incident from the component that has experienced the new incident (step 424). The incident detection logic updates the incident index with an identifier of the new incident, the date/time associated with the new incident, and the component affected by the new incident (step 426).

The incident detection logic then notifies data replication logic to perform data replication detection with regard to the new incident dump file (step 428). The data replication logic accesses the new incident dump file and corresponding preceding incident dump file(s) for the component in the storage in order to compare the new incident dump file(s) to the corresponding preceding incident dump file(s). The data replication logic identifies whether the date/time associated with each of the new incident dump file(s) differs from the date/time associated with the corresponding preceding incident dump file(s) (step 430). If at step 430 the data replication logic determines that the files do not differ in date/time, then the data replication logic stops diagnostic data replication detection and proceeds to step 402. If at step 430 the data replication logic determines that the files differ in date/time, the data replication logic determines a difference between the new incident dump file and the corresponding preceding incident dump file(s) (step 432). The data replication logic determines the difference between each new incident dump file and the corresponding preceding incident dump file(s) by performing, for example, a bit-wise or text-wise comparison depending on the type of diagnostic data in the dump file.

In comparing the new incident dump file to the corresponding preceding incident dump file(s), the data replication logic generates a temporary comparison file that comprises the differences identified in the new incident dump file that are not found in the corresponding preceding incident dump file (s) (step 434). When the data replication logic completes the comparison of the new incident dump file to the corresponding preceding incident dump file(s), the data replication logic determines whether the file size of temporary comparison file is less than the file size of the new incident dump file (step 436). If at step 436 the data replication logic determines that the temporary comparison file is less than the file size of new incident dump file, then data replication logic stores the temporary comparison file as a comparison dump file (i.e. a delta file) (step 438), which indicates that the new incident dump file comprises some information that is duplicated in the preceding incident dump file and has already been reported to the support system, if at step 436 the data replication logic determines that the temporary comparison file is equal to the file size of the new incident dump file, then the data replication logic may recognize that the new incident dump file comprises completely different information from the preceding incident dump file so that the new incident dump file is used as the comparison dump file (step 440a) or generate a comparison dump file as a delta file that is equivalent to the new incident dump file (step 440b). From steps 438, 440a, or 440b, the data replication logic updates the incident index (step 442) to indicate that the comparison file from step 438 is a delta file for the new incident dump file, to indicate that the new incident dump file from step 440a is a delta file if the data replication logic recognizes that the new incident dump file comprises completely different information from the preceding incident dump file, and/or to indicate that the comparison dump file from step 440b is a delta file for the new incident dump file even though they files may be equivalent in size. From step 442 the operation proceeds to step 414.

The flowchart and block diagrams in the figures illustrate the architecture, functionality, and operation of possible implementations of systems, methods and computer program products according to various embodiments of the present invention. In this regard, each block in the flowchart or block diagrams my represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for transmitting only changed or "delta" information from previous report packages rather than sending an entire report package from each encountered incident. By only reporting changed or "delta" information, less diagnostic data is transmitted between the customer site and the support site, thereby resulting in less bandwidth usage and less time waiting for data transfer. Additionally, in order to view the diagnostic data related to a particular incident, any individual (either on site or internal service personnel, customers, auditors, etc.) may simply access the incident index, pick the appropriate diagnostic data for the incident they are interested in, and if necessary package up selected diagnostic data and send the selected diagnostic data to anyone else. Further, less data storage is required at both the customer site and the support site to keep a complete history of a customer's incidents due to the fact that old duplicate logs are not re-sent or redundantly stored at the support site, and recycled logs may be deleted at the customer site without having to delete them at the support site. That is, the incident index provides a readily accessible machine history.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reducing duplicate information when reporting data processing system incidents, the method comprising:

receiving diagnostic data associated with a new incident that has occurred in the data processing system;

creating at least one new incident dump file for the new incident that includes some or all of the diagnostic data;

comparing the diagnostic data in the at least one new incident dump file to diagnostic data in at least one corresponding preceding incident dump file;

responsive to the at least one new incident dump file comprising diagnostic data that is different from the at least one corresponding preceding incident dump file, generating at least one comparison dump file that comprises only the differences in the at least one new incident dump file that are not contained in the at least one corresponding preceding incident dump file, wherein generating the at least one comparison dump file that comprises only the differences in the at least one new incident dump file that are not contained in the corresponding preceding incident dump file further compromises:

generating at least one temporary comparison file that comprises the differences in the at least one new incident dump file that are not contained in the at least one corresponding preceding incident dump file;

comparing a size of the at least one temporary comparison file to a size of the corresponding new incident dump file;

responsive to the size of the at least one temporary comparison file being less than the size of the corresponding new incident dump file, storing the at least one temporary comparison file as the at least one comparison dump file in a storage device in the data processing system; and responsive to the to the size of the at least one temporary comparison file being greater than or equal to the size of the corresponding new incident clump file, storing the corresponding new incident dump file as the at least one comparison dump file in a storage device in the data processing system; and transmitting a report package to a support system, wherein the report package includes the at least one comparison dump file.

2. The method of claim 1, wherein the at least one new incident dump file, the at least one corresponding preceding incident dump file, and the at least one comparison dump file are stored in an incident profile in a storage device in the data processing system.

3. The method of claim wherein, in creating the at least one new incident dump file, the method further comprises:

updating the incident index to reflect the at least one new incident dump file.

4. The method of claim 2, wherein, in generating the at least one comparison dump file, the method further comprises:
   updating the incident index to reflect the at least one comparison dump file.

5. The method of claim 1, further comprising:
   after transmitting the report package to the support system, replicating a incident profile located in the storage device of the data processing system with a incident profile for the data processing system in a storage device of the support system.

6. The method of claim 1, wherein the at least one comparison dump file is generated only if a date/time of the at least one new incident dump file differs from a date/time of the corresponding preceding incident dump file.

7. A computer program product comprising a computer readable storage medium having a computer readable program stored therein, wherein the computer readable program, when executed on a computing device, causes the computing device to:
   receive diagnostic data associated with a new incident that has occurred in a data processing system;
   create at least one new incident dump file for the new incident that includes some or all of the diagnostic data;
   compare the diagnostic data in the at least one new incident dump file to diagnostic data in at least one corresponding preceding incident dump file;
   responsive to the at least one new incident dump file comprising diagnostic data that is different from the at least one corresponding preceding incident dump file, generate at least one comparison dump file that comprises only the differences in the at least one new incident dump file that are not contained in the at least one corresponding preceding incident dump file, wherein the computer readable program to generate the at least one comparison dump file that comprises only the differences in the at least one new incident dump file that are not contained in the corresponding preceding incident dump file further causes the computing device to:
      generate at least one temporary comparison file that comprises the differences in the at least one new incident dump file that are not contained in the at least one corresponding preceding incident dump file;
      compare a size of the at least one temporary comparison file to a size of the corresponding new incident dump file;
      responsive to the size of the at least one temporary comparison file being less than the size of the corresponding new incident dump file store the at least one temporary comparison file as the at least one comparison dump file in a storage device in the data processing system; and
      responsive to the to the size of the at least one temporary comparison file being greater than or equal to the size of the corresponding new incident dump file, store the corresponding new incident dump file as the at least one comparison dump file in a storage device in the data processing system; and
   transmit a report package to a support system, wherein the report package includes the at least one comparison dump file.

8. The computer program product of claim 7, wherein the at least one new incident dump file, the at least one corresponding preceding incident dump file, and the at least one comparison dump file are stored in an incident profile in a storage device in the data processing system.

9. The computer program product of claim 8, wherein the computer readable program to create the at least one new incident dump tile further causes the computing device to:
   update the incident index to reflect the at least one new incident dump file.

10. The computer program product of claim 8, wherein the computer readable program to generate the at least one comparison dump file further causes to computing device to:
    update the incident index to reflect the at least one comparison dump file.

11. The computer program product of claim 7, wherein the computer readable program further causes the computing device to:
    after transmitting the report package to the support system, replicate a incident profile located in the storage device of the data processing system with a incident profile for the data processing system in a storage device of the support system.

12. The computer program product of claim 7, wherein the at least one comparison dump file is generated only if a date/time of the at least one new incident dump tile differs from a date/time of the corresponding preceding incident dump file.

13. An apparatus, comprising:
    a processor; and
    a memory coupled to the processor, wherein the memory comprises instructions which, when executed by the processor, cause the processor to:
    receive diagnostic data associated with a new incident that has occurred in a data processing system;
    create at least one new incident dump file for the new incident that includes some or all of the diagnostic data;
    compare the diagnostic data in the at least one new incident dump file to diagnostic data in at least one corresponding preceding incident dump file;
    responsive to the at least one new incident dump file comprising diagnostic data that is different from the at least one corresponding preceding incident dump file, generate at least one comparison dump file that comprises only the differences in the at least one new incident dump file that are not contained in the at least one corresponding preceding incident dump file, wherein the instructions to generate the at least one comparison dump file that comprises only the differences in the at least one new incident dump file that are not contained in the corresponding preceding incident dump file further cause the processor to:
       generate at least one temporary comparison file that comprises the differences in the at least one new incident dump file that are not contained in the at least one corresponding preceding incident dump file;
       compare a size of the at least one temporary comparison file to a size of the corresponding new incident dump file;
       responsive to the size of the at least one temporary comparison file being less than the size of the corresponding new incident dump file, store the at least one temporary comparison file as the least one comparison dump file in a storage device in the data processing system; and
       responsive to the to the size of the at least one temporary comparison file being, greater than or equal to the size of the corresponding new incident dump file store the corresponding new incident dump file as the at least one comparison dump file in a storage device in the data processing system; and transmit a report package to a support system, wherein the report package includes the at least one comparison dump file.

14. The apparatus of claim 13, wherein the at least one new incident dump file, the at least one corresponding preceding incident dump file, and the at least one comparison dump file are stored in an incident profile in a storage device in the data processing system.

15. The apparatus of claim 14, wherein the instructions to create the at least one new incident dump file further cause the processor to:
update the incident index to reflect the at least one new incident dump file.

16. The apparatus of claim 14, wherein the instructions to generate the at least one comparison dump file further cause to processor to:
update the incident index to reflect the at least one comparison dump file.

17. The apparatus of claim 13, wherein the instructions further cause the processor to:
after transmitting the report package to the support system, replicate a incident profile located in the storage device of the data processing system with a incident profile for the data processing system in a storage device of the support system.

18. The apparatus of claim 13, wherein the at least one comparison dump file is generated only if a date/time of the at least one new incident dump file differs from a date/time of the corresponding preceding incident dump file.

* * * * *